United States Patent [19]
Clapper

[11] 3,770,892
[45] Nov. 6, 1973

[54] CONNECTED WORD RECOGNITION SYSTEM

[75] Inventor: Genung Leland Clapper, Raleigh, N.C.

[73] Assignee: International Business Machines Corporation, Armonk, N.Y.

[22] Filed: May 26, 1972

[21] Appl. No.: 257,254

[52] U.S. Cl. .................. 179/1 SB
[51] Int. Cl. .................. G10l 1/02, G10l 1/16
[58] Field of Search .................. 179/1 SA, 1 SB, 1 VS, 179/15.55 R

[56] References Cited

UNITED STATES PATENTS

| | | | |
|---|---|---|---|
| 3,234,392 | 2/1966 | Dickinson | 179/1 SA |
| 3,204,030 | 8/1965 | Olson | 179/1 SB |
| 2,685,615 | 8/1954 | Biddulph | 179/1 SB |
| 3,280,257 | 10/1966 | Orthuber | 179/1 SB |
| 3,172,954 | 3/1965 | Bezar | 179/1 SA |

OTHER PUBLICATIONS

Olson, Speech Processing Systems, IEEE Spectrum, 2/1964 p. 90 - 102.

Clapper, Connected Word Recognition System, IBM Technical Disclosure Bulletin, 12/69 p. 1123–1126.

*Primary Examiner*—Kathleen H. Claffy
*Assistant Examiner*—Jon Bradford Leaheey
*Attorney*—Edward H. Duffield et al.

[57] ABSTRACT

A system is disclosed which recognizes connected or separate spoken words based on the concatenation of steady state sounds produced by a speaker enunciating a given word for which a definitive array of steady state sounds has previously been entered into the system during a learning period.

10 Claims, 13 Drawing Figures

PATENTED NOV 6 1973 3,770,892

SHEET 02 OF 11

PATENTED NOV 6 1973 3,770,892

SHEET 06 OF 11

FIG. 12

UNIPHONES

CONSONANT

| | FEATURES FROM BANDPASS ANALYZER | | | | | | | |
|---|---|---|---|---|---|---|---|---|
| | 1 | 2 | 3 | 4 | 5 | 6 | 7 | 8 |
| F | 1 | | | | | | | |
| S | 1 | 1 | | | | | | |
| T | 1 | 1 | 1 | | | | | |
| TH | 1 | | 1 | 1 | | | | |
| V | 1 | | | | | | | 1 |
| Z | 1 | 1 | | | | | | 1 |
| L | | | 1 | | | 1 | 1 | |
| M | | | | 1 | | 1 | | 1 |
| N | | | 1 | | 1 | | | 1 |
| R | | | | 1 | 1 | 1 | | |

VOWEL

| | FEATURES FROM BANDPASS ANALYZER | | | | | | | |
|---|---|---|---|---|---|---|---|---|
| | 1 | 2 | 3 | 4 | 5 | 6 | 7 | 8 |
| AA | | 1 | 1 | | | | 1 | 1 |
| EE | | | 1 | | | | | 1 |
| IH | | | 1 | 1 | | | 1 | 1 |
| AE | | | 1 | 1 | | 1 | | |
| EH | | | 1 | 1 | | 1 | 1 | |
| AH | | | | 1 | 1 | 1 | | 1 |
| AW | | | | | 1 | 1 | 1 | 1 |
| UH | | | | | 1 | | 1 | 1 |
| OH | | | | | | 1 | 1 | 1 |
| OO | | | | | | | 1 | 1 |

BLANKS ARE ZEROS

WORDS

SR4 - 3 - 2 - 1 - 0
OO-OH-UH-N
( )$^{B}$-T-EE-OO
( )-TH-R-EE
( )-F-OH-R
( )-F-AH-EE-V
S-IH-(K)-S
S-EH-V-N
AA-EE-( )-T
N-AH-EH-N
Z-EE-R-OH
(P)$^{B}$-L-UH-S
M-AH-IH-N-UH-S
(P)$^{B}$-AW-EE-N-( )-T ( ) = SILENCE BEFORE P,T,K,F,TH,B,D,G.

B = BURST OR RISE IN INTENSITY FOLLOWING P,T,K,B,D,G.

CONNECTED WORD RECOGNITION SYSTEM

FIELD OF THE INVENTION

This disclosure relates to speech and word recognition systems and communication devices in general. More particularly, it relates to speech recognition systems based on steady state sounds rather than transitional sounds.

PRIOR ART

As detailed in an article by Genung L. Clapper, entitled "Automatic Word Recognition" which appears in the IEEE Spectrum, August, 1971, pages 57–69, automatic word recognizers must use some form of speech analysis. One such type of analysis uses a sound spectrograph which provides visible evidence of the resonances of the vocal tract that produce patterns of energy concentration in the frequency domain known as "formants" which have been used in speech analysis and synthesis. This early tool has been used to isolate the formants in speech which may be used to produce intelligible speech. This reveals that the important information bearing elements, at least from a human hearing standpoint, lie in combinations of unique formants.

A commercially available frequency spectrum analyzer known as a sonograph can be utilized to provide a visible reproduction (known as a sonogram) of the distribution of sound energy as a function of frequency, time and intensity. It is a very useful tool in identifying the peculiar glottal impulses, frequency/energy distribution and modulation characteristics produced by a given speaker. Unfortunately, the sound spectrogram or sonogram contains such a wealth of information that many confusing details exist in its trace and it is necessary for the trained eye to select certain dominant features for further analysis. Recently, the general purpose computer has been programmed to provide spectrographic information directly from an acoustic signal. However, like the sound spectrogram, this method provides more detailed information than is found necessary or even easily usable for the recognition of individual words.

In order to reduce the amount of information used for analysis, various experimenters have utilized the breaks or abrupt frequency transition points in the spectrogram as key features for analysis. While a certain degree of success has been attained previously by using the transitional points in a spoken work as recognition indicia, variations in individaul enunciation of the same word create a difficult problem in recognition of the same word for more than one individual speaker. Massive memory and comparison devices have generally been required to digest and compare the variety of transitional sequences which may be produced by various speakers in order to effectively recognize the same word.

EVen greater problems are involved in the recognition of connected words because word boundaries are uncertain and because there is often elision in which the next word is begun before the last one is completed. Additionally, a given spoken word will produce different acoustic signals depending on the context in which it is used. The slight differences in enunciation given by the speaker to convey various emotional, conotational, and other degrees of emphasis and difference will all produce different acoustic signals even for the same word. This problem has led some researchers to strive not for the recognition of a word as such, but for recognition based on some smaller and more basic unit such as a syllable or a phoneme. However, the recognition of smaller units requires the subsequent concatenation of the subunits into words. This prior technique required a powerful computer for comparison of such concatenations against stored patterns to identify a given word.

OBJECTS OF THE INVENTION

In view of the foregoing difficulties and shortcomings in prior speech recognition efforts, it is an object of this invention to provide an improved speech recognition system capable of recognizing either discrete or connected words.

It is a further object of this invention to provide an improved recognition system based on a relatively small library of idealized steady state sounds.

It is another object of this invention to provide a speech recognition system which is easily adaptable to a given person, so that words spoken by him can be recognized.

SUMMARY OF THE INVENTION

The foregoing and other objects of this invention are achieved by analyzing the continuous production of vocal sounds to isolate steady state tones, hereinafter described more particularly as "uniphones," which may be compared against stored patterns of uniphones for a given speaker so that the particular uniphones produced can be identified. Identified sequences of uniphones making up a word are then compared against a uniphone to word conversion library for a given speaker to identify a close match which indicates which word was spoken.

BRIEF DESCRIPTION OF THE DRAWINGS

FIG. 12 shows an arbitrary uniphone library of sounds for a hypothetical speaker.

Turning to FIG. 1, an overall block diagram of the word recognition system of this invention is illustrated. Words spoken into microphone 1 are converted into electrical signals which are amplified and then analyzed in a series of contiguous bandpass filters in speech analyzer 2. Outputs from the filters are rectified and further filtered to produce different DC voltage levels on the outputs of speech analyzer 2. The outputs from speech analyzer 2 represent the signal levels produced by the frequency response of the vocal cavities of the particular speaker during enunciation of a given word or sound across the frequency spectrum encompassed by the contiguous bandpass filters located within analyzer 2. A separate output is produced by each filter which corresponds to the energy distribution found within the subportion of the band covered by that filter.

Figure 1:
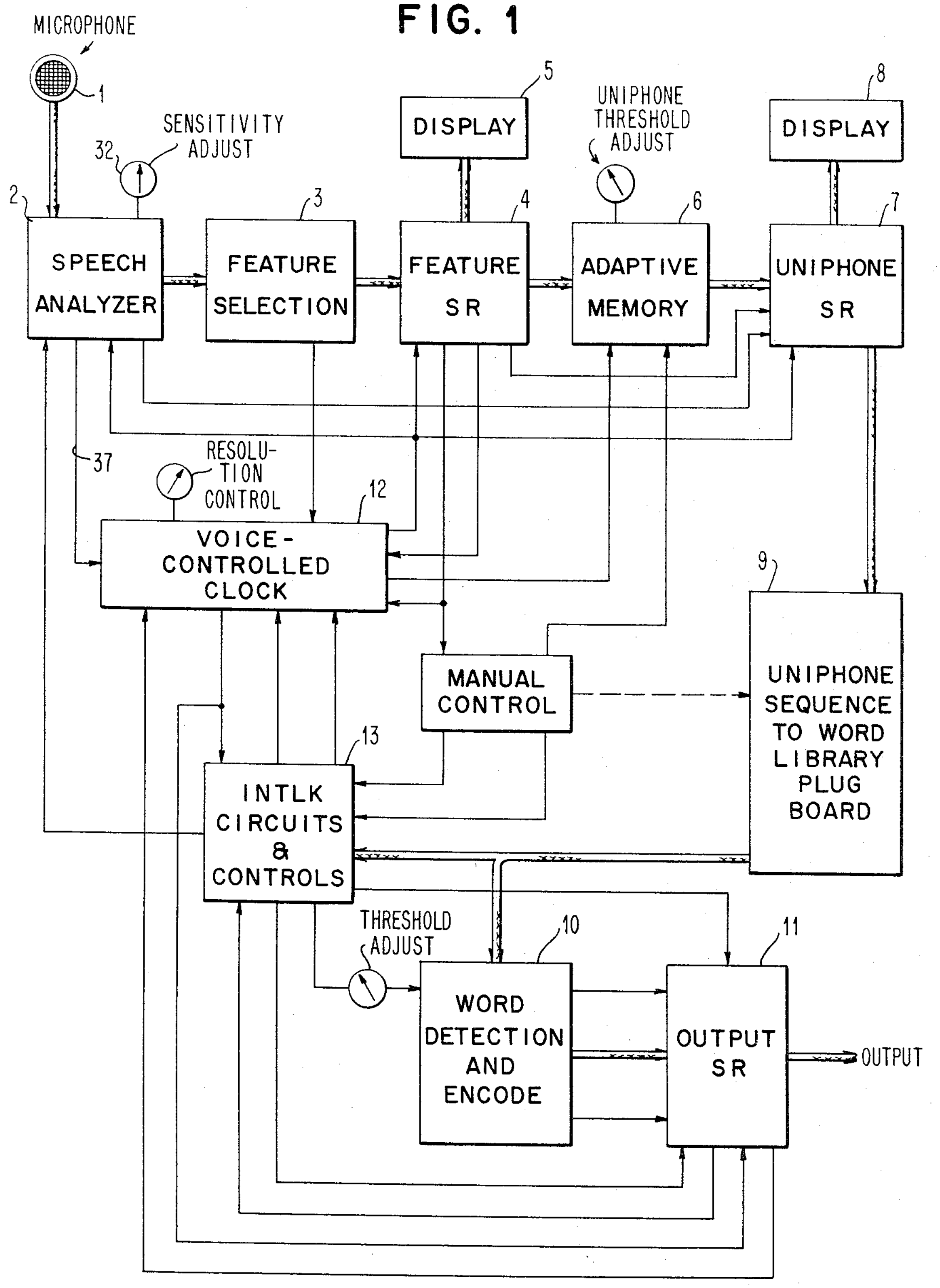
FIG. 1 illustrates a schematic diagram of the overall word recognition system of this invention.

Feature selection circuits 3 identify salient features or poles of energy concentration within the frequency spectrum envelope function appearing as voltage levels from the output of speech analyzer 2. The feature selection circuits 3 are provided with self-adjusting thresholds and pulse shaping units, to be discussed later, which produce well shaped, jitter free, square wave pulses of standard amplitude for input to the feature shift register 4. Only those signals from various sub-bandpass filters which exceed the self-adjusting threshold level will be passed through the feature selection circuits 3 to be stored temporarily as the selected features of the sound being analyzed. In feature shift register 4, the features thus identified are temporarily stored for display on a display means 5. These features make up a candidate uniphone as a series of 1's and 0's representative of on or off functions above a given threshold for each sub-bandpass channel output from the feature selection circuits 3. During machine adaptation to a given speaker, the presence of this unique sequence of 1's and 0's in the shift register 4 is utilized to stop a clock, to be discussed later, until the sequence of 1's and 0's is entered into adaptive memory 6. Adaptive memory 6 comprises a number of memory units known as electronic templates. These units are fully described in the IEEE Spectrum for Aug., 1971, pages 57–69, in an article by the inventor of the present system. They are also fully set forth in U.S. Pat. No. 3,539,994, assigned to a common assignee with the present application, which for purposes of description of the electronic templates in an adaptive memory unit, is made a part of this specification and will be discussed in greater detail later.

During a training period for the machine, a speaker vocally produces a selected list of words from which are chosen the desired sounds for classification arbitrarily into one of ten consonants and ten vowel categories which make up the set of uniphones for a given speaker. Only 20 uniphones are utilized in this example, but an expanded set of uniphones could be utilized, if desired, to increase the recognition power of the system. These uniphones are stored in the electronic templates of adaptive memory 6.

During initial vocal recognition for setting up the library, spoken words for later analysis will first be analyzed in speech analyzer 2, the salient features will be extracted in feature selection circuits 3 and stored in the feature shift register 4 from which they can be compared against the contents of adaptive memory 6 to identify the uniphone content of the word being analyzed. The sequences of recognized uniphones from adaptive memory 6 will be temporarily stored in uniphone shift register 7 for display on a display device 8. A word library for specific words to be recognized may then be built up by connecting identified uniphone sequences to assigned word detectors using a device such as a plugboard or equivalent digital memory means, so that the production of a given sequence of uniphones will activate a signal indicative of a given word from the word detection and encoder means 10. During automatic operation of the system, words spoken into the microphone result in the production of sequences of uniphones which are recognized in adaptive memory 6, are temporarily stored in shift register 7 and are selectively connected by plugboard 9 to word detection and encoder means 10. Words are recognized in word detection and encoder means 10, and encoded with a word code in encoder 10 for storage in output shift register 11 where they may be made available for inspection and verification before use.

From this brief discussion, it may be seen that a given word which may be encoded by standard encoding techniques into tens of thousands of bits representative of the entire frequency content of the word can be made to finally appear as a validated code of many fewer bits at the output of the word recognition system. Prior recognition systems based on whole word patterns must necessarily use orders of magnitude more memory to store word patterns than this recognition system which is based on storing a small number of basic speech characteristics. A great advantage of this invention is that recognized words can be digitized for transmission and reduce the number of bits required for transmission by several orders of magnitude. Furthermore, words thus encoded can be made secure from unauthorized recognition or interception during transmission since any arbitrary coding can be used for the transmission of a given word provided that the coding is known at both ends of the transmission system. Note also, that language translation can be easily accommodated once a word has been recognized and digitized, by simply converting the digitized word in some memory device into an output in another language. Note also, that spoken words could be translated into printed words merely by driving a printer on other visible display with the encoded digitized representation of a given word.

Referring again to the overall block diagram of FIG. 1, a voice-controlled clock 12 and interlock circuits 13 are utilized to interconnect and coordinate the functions of the other major blocks described above. The description of these elements in greater detail will be undertaken below.

Figure 2:
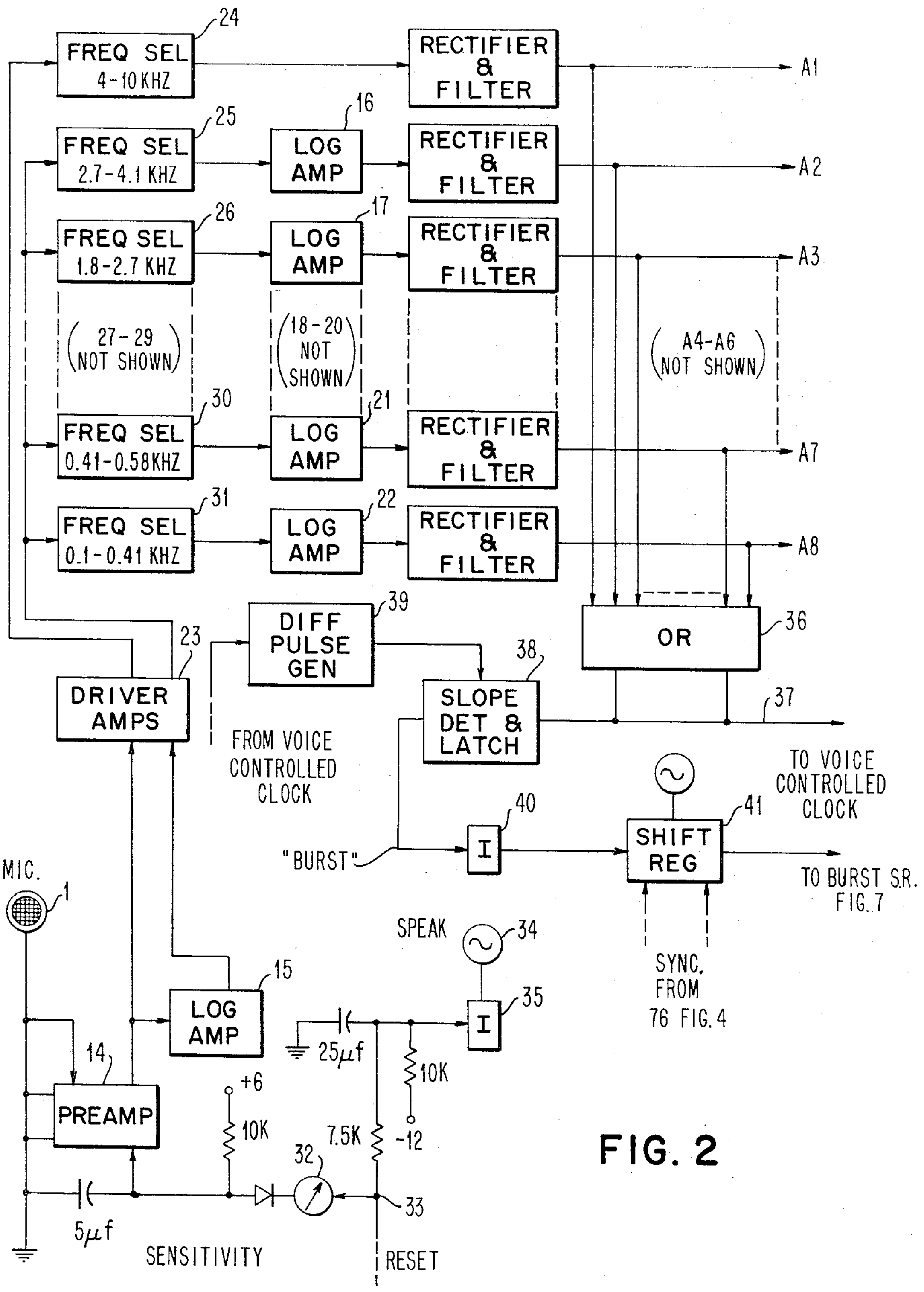
FIG. 2 shows a schematic illustration of a speech analyzer utilized in this invention.

Turning now to FIG. 2, the speech analyzer 2 is illustrated in schematic form. Analyzer 2 utilizes a bank of relatively broadband filters to analyze the acoustic signal coming from microphone 1 across a given section of the frequency domain.

The acoustic signal from microphone 1 is amplified in preamplifier 14 whose output is then normalized through the use of logarithmatic amplifier 15. These amplifiers are well-known and may be constructed to use non-linear diode characteristics. The particular ones utilized in the invention illustrated have unity gain for input signals with five volts peak to peak amplitude. Signals having lower amplitudes than these are amplified, while signals having higher amplitudes are attenuated. The preliminary logarithmic amplifier 15 is placed between the preamplifier 14 and a common driver 23 where it operates in a lower signal range from 0.1 to 1.0 volts to boost the low end signals to a more usable level. Other logarithmatic amplifiers 16 through 22 are placed at the output of the frequency selectors 25 through 31 and operate to reduce the output signals which are above five volts peak to peak amplitude. A range of input signals from 0.1 to 10 volts is compressed into a range of 0.3 to 6.6 volts by each amplifier. This reduces the dynamic range over which the amplifier must act from 100 to 1 to 22 to 1.

Frequency selector 24 has a relatively constant peak to peak output and produces variations on output line A1 which do not need the use of a logarithmic amplifier. Input attenuators are included on all of the frequency selectors 24 thorugh 31 to adjust to a negative 3-db per octave slope of amplitude with increasing frequency which is a characteristic of human vocal sound production. For sake of simplicity, these attenuators are not illustrated but may take the form of potentiometers.

A manual sensitivity adjustment 32 is set to reject room noise picked up by microphone 1. In a noisy environment, the operator will naturally tend to speak in louder tones and in such circumstances, sensitivity is therefore reduced. A reset interlock 33 further reduces sensitivity during resetting operations as will be discussed later. A speak indicator lamp 34, or other similar signalling device, is off during reset operation and comes back on with a time delay set by the capacitor/resistor input set on inverter 35 to assure that the preamplifier gain from preamplifier 14 is back to normal before the indicator lamp 34 comes on.

Signals appearing on output line A1 through A8, taken instantaneously, will represent various DC voltage levels. They are mixed in a positive OR circuit 36 to provide a signal for starting the voice controlled clock 12 on line 37. This signal is also used as an input to the slope detector and latch circuit 38, as described in U. S. Pat. No. 3,236,947, which provides an indication of a speech "burst." A burst is defined as an abrupt rise in intensity which occurs following a stop consonant. A latch in detector and latch circuit 38 is set until the next clock pulse from the voice controlled clock 12 turns it off through the differentiating pulse generator 39. An inverter 40 is used to set voltage levels and produce the correct phase for operating shift register 41 which provides temporary storage and indication of the phase of the latch circuit. Output lines A1 through A8 are connected to the feature selection circuitry 3.

Frequency selector ranges of frequency selectors 24 thorugh 31 are designed to give optimum coverage of the frequency spectrum from 0.1 Hz to 10K Hz. As illustrated in FIG. 2, a broad band frequency selector 24 covers the range from 4K Hz to 10K Hz which contains the high frequency noise energy of fricative and some sibiliant sounds. This selector uses a low-pass filter and differential amplifier to obtain a broad high-pass filtering action with a sharp cutoff at the 4K Hz window. The next selector 25 is a moderately broad bandpass filter of standard design covering the 2.7 to 4.1K Hz frequency range. This is the region in which the concentration of noise energy for sibilant sounds occurs most heavily. The remaining frequency selectors have ranges that are approximately equally spaced, when plotted on a scale representing the logarithm of frequency, so that the ranges covered are packed more closely in the lower half of the spectrum being analyzed. Seven of the eight selectors cover the frequency spectrum from 0.1K Hz to 4.1K Hz. For simplicity, several of these intermediate selectors (27–29) are omitted from FIG. 2, as are the corresponding amplifiers (18–20). The lowest frequency range, 0.1 to . 41K Hz covered by frequency selector 31 has a braod bandpass characteristic to encompass both male and female voice fundamental pitch frequencies.

The frequency spectrum is divided into bands which are broad enough to remove the harmonic fine line structure which occurs in a sonogram of the normal human voice, and the selector outputs from selectors 24 through 31 are rectified and smoothed in filtered rectifiers attached to the outputs thereof to detect the envelope function of the input signal. This produces a short time integration of the signal passed by each bandpass filter and the outputs from the low-pass filters are thus slowly varying DC levels whose amplitudes at any given time correspond to the envelope function of the input signal. The aforementioned input attenuator adjustments compensate for a negative 3-db slope of the normal human voice amplitude characteristic. The speech analyzer outputs A1 through A8 are representative of frequency-quantized envelope amplitude functions which describe the changes in a given speaker's vocal cavity resonances in real time.

The speech analyzer outputs A1 through A8 are mixed together in a diode positive OR circuit 36 as previously discussed to provide a control signal to the voice controlled clock 12 where it controls the end of word detection in the time base generator as will be discussed later.

Figure 3:
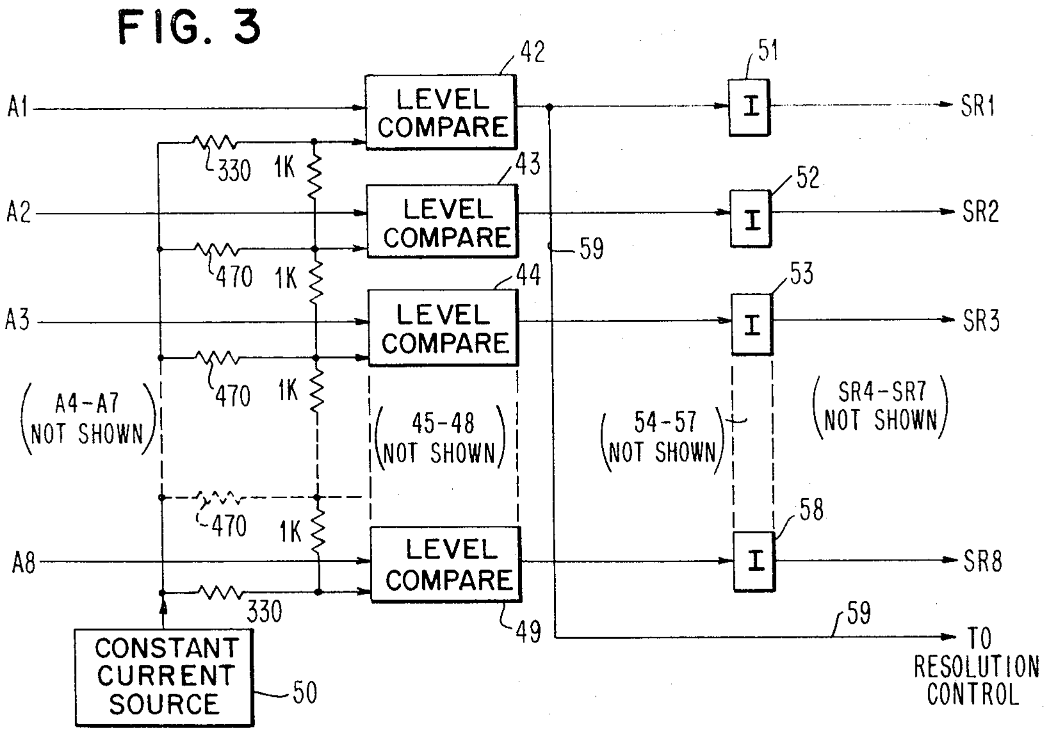
FIG. 3 illustrates a feature selection apparatus utilizing the outputs from the speech analyzer illustrated in FIG. 2, which serves the function of producing candidate uniphone signals for comparison and identification.

Turning now to FIG. 3, the feature selection circuits will be discussed. Feature selection circuits 3 perform the function roughly analogous to that of an eye that scans a sonogram looking for features (energy concentrations around specific resonant frequencies). Just as an eye takes note of differences in darkness of various parts of a sonogram, so the feature selection circuits 3 compare the analyzer outputs on lines A1 through A8 against threshold voltages that are derived from a resistor network. Each threshold voltage tends to follow its own input line A1 through A8 and is held to a voltage no lower than a few tenths of a volt below the input voltage. Through the resistor network illustrated, each input affects all other thresholds, with the greatest effect being on immediate neighbors. Thus, the local maxima in the envelope function of the frequency spectrum are effective to produce outputs from the amplitude comparison circuits 42 through 49 and at the same time are used to prevent outputs from the neighboring units which have inputs of lesser amplitudes. These amplitude comparison circuits are analog differentiators as described in the IBM, Technical Disclosure Bulletin, November 1968, Volume 11, No. 6, page 603. The effect of the resistor network illustrated is to produce a "floating" or self-adjusting threshold voltage previously referred to that permits only the poles or energy concentrations within the envelope function having higher amplitudes to pass through the amplitude comparison circuits regardless of the absolute amplitude of the incoming envelope function. A constant current source 50 limits the maximum number of amplitude comparison circuits 42 through 49 which may be on to an arbitrarily designated number of four. The outputs of amplitude comparison circuits 42 through 49 are applied to separate inverters 51 through 58 which change the voltage level to the proper sign to couple the outputs to the feature shift register 4. These signals appear on lines SR1 through SR8. The output from the amplitude comparison circuit 42 is also utilized over line 59 as a resolution control with a voice controlled clock 12 to be discussed later. Analog differentiator circuits 42 through 49 include circuitry having hysteresis and a shaping effect so that the final output of SR1 through SR8 are, as previously alluded to, well-shaped, jitter free, square wave pulses of standard amplitude, (such as −12 to 0 volts). The outputs SR1 through SR8 are the inputs to a matrix of storage units that make up feature shift register 4, which stores the envelope information derived from the speech analyzer 2 at various points in time as determined by the voice controlled clock 12 as discussed below.

Figure 4:
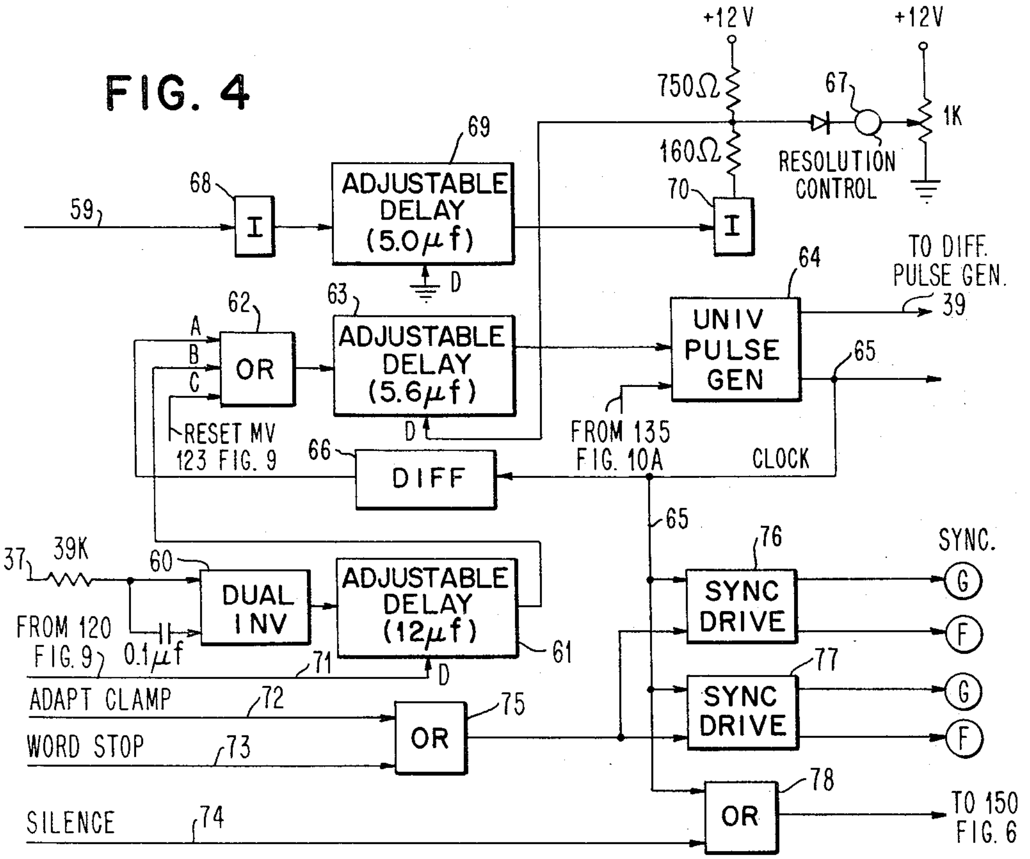
FIG. 4 illustrates, in schematic form, a voice controlled clock utilized in the invention to provide synchronizing pulses for the registers and to control the overall operation of the system.

Turning now to FIG. 4, the speech or voice controlled clock 12 and its function will be described. The speech controlled clock 12 is a key feature of this invention, since speech features are stored in the feature shift register 4 with reference to output pulses provided by this clock. Non-linearity has been used previously in order to achieve a desirable compression of information while removing the effects of uncertainty in time position for recognition with whole word patterns. In situations where discrete words are to be recognized, it has been observed that sounds close to the start of the words are more consistent in timing, with reference to the points at which resonances appear on the spectrogram, than those nearer the end of a word. When sampling is done at regular intervals, the variation in position in which features are sensed in time seems to increase linearly with distance from the beginning of the word. By sampling at a rate that starts at a given sampling rate but constantly slows with time, the number of time units in each succeeding time slot can be made to increase linearly. Thus, each successive time slot widens to receive the expected variation of the central feature to be found in that portion of the spectrogram.

Of course, features may still appear in two time slots whenever they occur in a time slot boundary. However, this is preferable to having them spread over five or six slots or sampling positions. Also, there is a tendency to cluster the final features of a word, but this is offset by the speaker's natural tendency to draw out or prolong the ends of words and to be crisp and precise with beginning sounds. The net effect is a time compression and normalization of speech features with some blurring of detail that is not serious.

However, non-linearity alone does not provide sufficient definition where words are run together in connected speech. For discrete word applications, where the word is spaced apart from its neighbors with sufficient time for a reset operation between words, the non-linear time base, previously discussed, has proven quite suitable. However, in connected word recognition, the time for reset is lacking even if the end of the word were discovered in time. The clock for this system is thus based on the voice itself to create an artificial time base for sampling. For example, consider the word "six". This word begins and ends with long sibilant "S" sounds. Following the first "S" sound is a short "ih" sound followed by a relatively long silence or "stop" before a very short "K" sound which is the beginning sound of the final "X". The clock samples the long sibilant sounds at a slow rate and samples the short vowel sound at a higher rate, so as not to miss this important sound element. The stop is sampled once and then the clock is stopped until voicing resumes with the final "KS" sound. Of course, a long silence is present before the initial word of a phrase begins, so that the clock starts with the first voiced sound. Thus, long sounds are sampled less frequently to avoid redundant sampling while short sounds are sampled at least once and not passed over as would be the case with uniform sampling.

The summation of signals from the speech analyzer on lines A1 through A8 is, as previously mentioned, accomplished by the means of positive OR circuit 36 and is outputted over line 37 to start the voice controlled clock 12. In the voice controlled clock 12, the signal from line 37 is filtered in a low-pass resistor-capacitor filter and then doubly inverted by the dual inverter 60. The output of the dual inverter is applied to an adjustable delay unit 61. Delay unit 61 has a property that a rise in voltage at its input causes a negative output at once, but a negative input causes the output to go positive only after a delay in time, $\Delta t$, which is adjusted by setting the value of an internal capacitor. This delay in milliseconds is equal to $10 \times C$ in microfarads when the input to unit 61 at D is at ground potential. Thus, the delay for unit 61, which contains an internal capacitance of 12 microfarads, is 120 milliseconds. Breaks or interruptions in the summation signal from the feature selector 3 coming over line 37 up to 120 milliseconds in duration must be ignored and unit 61 will remain negative until the summation signal on line 37 is negative for more than 120 milliseconds. This time duration has been set based on empirical data. Such a delay has been found to presumptively isolate the stop consonant silence, illustrated schematically at various points in the figures as "()", which occurs before stop consonants such as *p*, *t*, *k*. The beginning of voice signals is used to start the clock 12, which then runs until the stop silence is detected whereupon the clock is stopped until the resumption of voicing.

As an example of the operation of the clock 12, consider the voicing of the beginning of a phrase. Before the start of the first word in the phrase, the signal on line 37 is negative as is the input to unit 61 from dual inverter 60. Therefore, the output from 61 is positive (0 volts), and OR 62 output to which 61 is connected is also positive. This holds adjustable delay unit 63, to which 62 is connected, in its negative output state and no clock pulse can be generated by universal pulse generator 64. Universal pulse generator 64 may be simply a single shot. When the signal on line 37 goes positive, the input to unit 61 rises to 0 volts and the output of unit 61 immediately goes negative allowing OR 62 to go negative. After a time determined by the 5.6 microfarad capacitor in unit 63 and by the voltage to input D of unit 63, the output of 63 goes positive and turns on the universal pulse generator 64. A positive pulse of short duration (5–10 ms.) is emitted by 64 to clock the various units over line 64. At the end of the clock pulse, differentiator 66 emits a positive pulse which feeds back to OR 62 and causes the output of OR 62 to rise and set delay 63 to its off condition. The differentiator pulse from unit 66 lasts for about 33 milliseconds at the end of which time adjustable delay 63 begins its delay cycle and the output of 63 rises at the end of the delay time to cause a new clock pulse to be emitted from universal pulse generator 64. When the signal at input D to unit 63 is near +12 volts, the initial delay is about 22 milliseconds for the first clock pulse and a second pulse appears about 55 milliseconds after the end of the first pulse, (which is about 5 milliseconds in duration). Thus, the minimum clock period is about 60 milliseconds. With input D to unit 63 near ground potential, the total period will be approximately 56 + 5 + 33, or 94 milliseconds. This is the upper limit for resolution control adjustment provided by control 67 to input D of unit 63 which adjusts for non-fricative sounds.

A signal on line 59 from the output of level comparator 42 denotes a fricative or sibilant sound from its concentration of energy in the higher frequency portion of the spectrum being analyzed. This signal is fed through inverter 68 where it is translated to a negative signal for application to the delay unit 69 which contains a 5 microfarad capacitor and is used as a fixed delay in the case illustrated, since input D is permanently grounded. After about 50 milliseconds delay, the output of delay unit 69 rises and energizes the input to inverter 70. The output of inverter 70 then drops to −6 volts and the resolution control signal applied at D for unit 63 drops to −3 volts regardless of the resolution control 67 setting. In delay unit 63, delay now doubles to about 112 milliseconds. The total period is 112 + 5 + 33 = 150 milliseconds. This is the sampling rate for long fricatives. It is roughly twice as long as the average for voiced sounds without the fricative. The 50 millisecond delay produced by 69 before the rate change assures that short fricative sounds, such as "T" will be sampled at a higher rate.

During resetting operations, a clock pulse is needed to clear out shift registers. The reset multivibrator (not shown in FIG. 4) is connected to unit 62 at input C. However, the signal on line 37 will be negative because of the reduction in preamplifier 14 sensitivity during the negative reset pulse applied through the manual sensitivity control 32 to preamplifier 14 gain control. The output of delay unit 61 would be positive so that its connection to OR 62 at point B would inhibit the action of the reset multivibrator signal but for the reset connection applied on line 71 to input D of delay unit 61. This is normally near ground, but is negative during reset operations, so that the output of delay unit 61 is forced to a negative level allowing the reset multivibrator signal at input C of unit 62 to be effective.

The adapt clamp 72 and word stop 73 signals mix in OR 75 to clamp the sync drive units 76 and 77 which provide synchronizing pulses for the feature shift register 4 and the uniphone shift register 7. The silence interlock 74 mixes in OR 78 with the clock pulse coming over line 65 from universal pulse generator 64, to clamp the electronic templates in adaptive memory 6 during periods of silence. This signal 74 is generated by the feature shift register 4, as will be discussed below.

Figure 5:
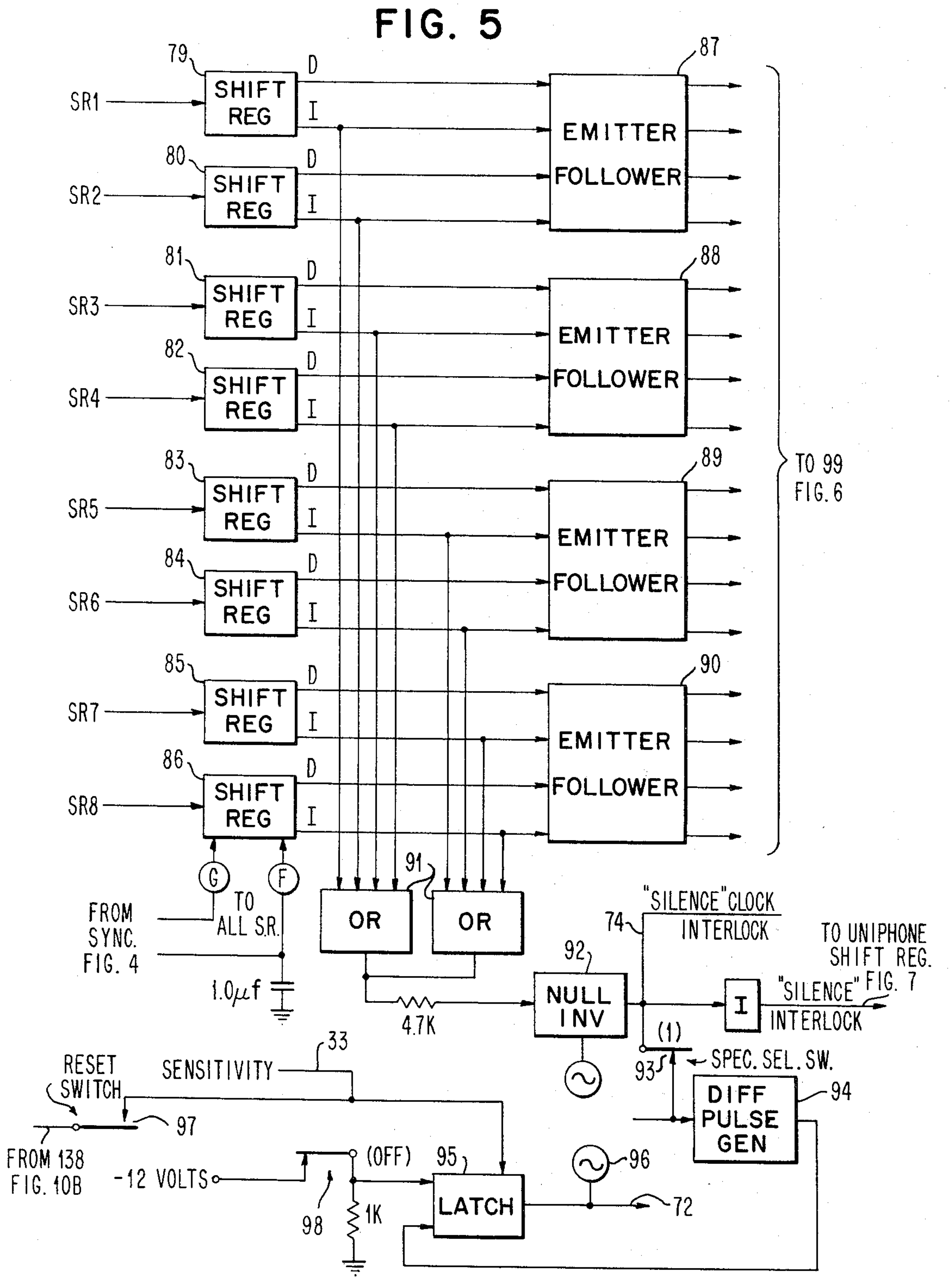
FIG. 5 illustrates in schematic form a controlled shift register presenting sequences of features to a memory device for comparison and identification of uniphones.

Turning now to FIG. 5, the feature shift register 4 is illustrated. Outputs from the feature selection circuit 3 appearing on lines SR1 through SR8 are applied to the inputs of the feature shift register units 79 through 86 under control of the sync pulses derived from voice controlled clock 12. The direct outputs D on shift register units 79 through 86 provide signals for the electronic templates in adaptive memory 6 through emitter followers 87 through 90. Inverse outputs I on shift register units 79 through 86 also provide outputs to the templates in adaptive memory 6 so that "negative features" or 0's are stored for the absence of a feature. Inverse outputs are also connected to OR gate 91 operating as a negative AND so as to detect the absence of features in the register, for example, when a "silence" exists. This is a negative signal from +6 volts to −6 volts so that a 4.7K dropping resistor is used to the input of the inverter 92. The null inverter 92 provides indication of silence and also provides a "silence" clock interlock signal on line 74 as previously discussed. It is also connected to position 1 of a special switch used during the adaptation or training period to select a given uniphone from a word. When this point of switch 93 goes negative, it is an indication that the silence between words has ended by the entering of the first sound of the word just spoken. This negative transient is transformed to a positive pulse by the differentiating pulse generator 94 which turns on latch 95 to provide an adapt clamp signal 96 and interlock on line 72 to the clock 12. Reset switch 97 resets latch 95. And select switch 98 keeps latch 95 inoperative during the recognition function.

Figure 6:
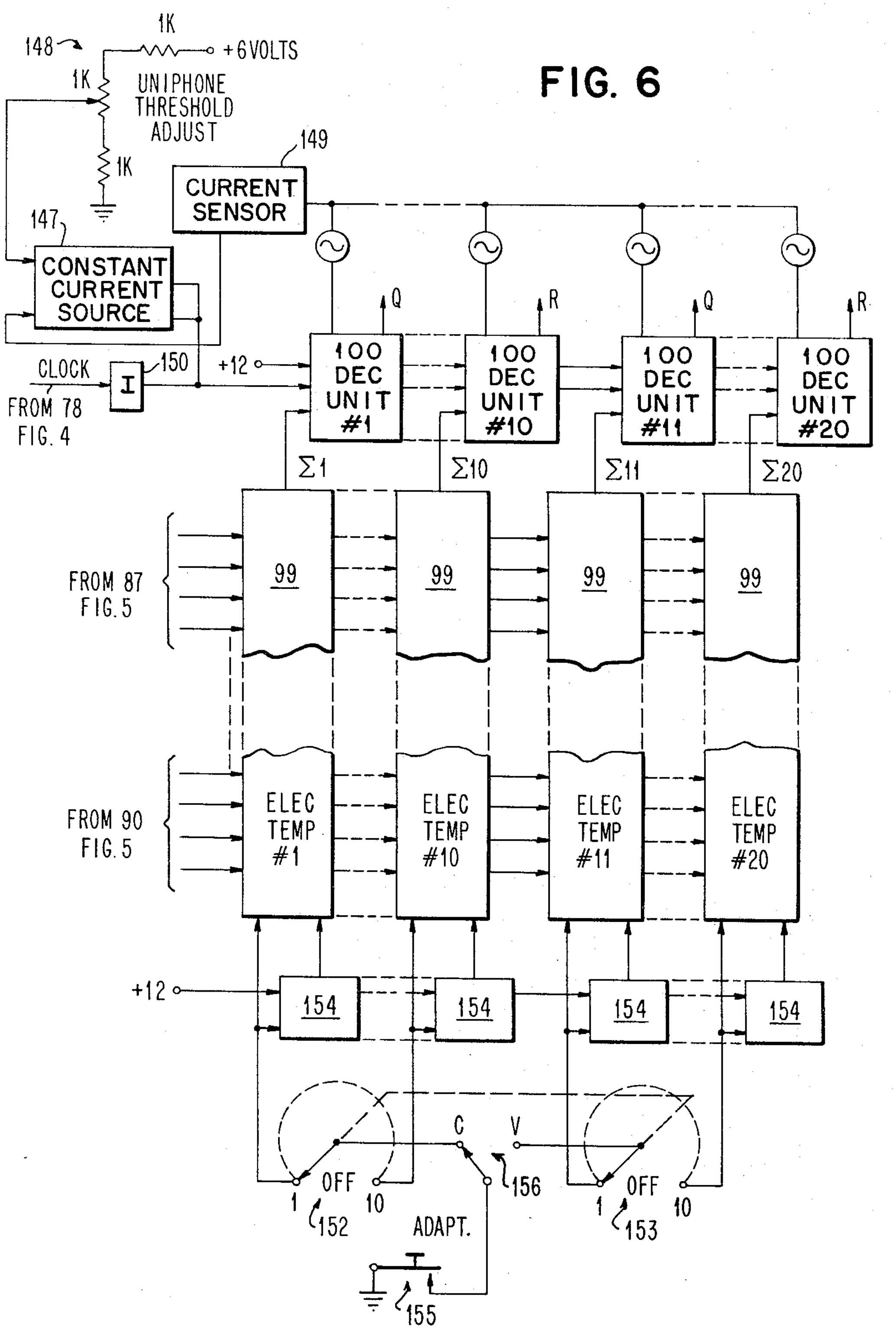
FIG. 6 illustrates in schematic form a memory device used in the invention to store and compare the features to a personalized set of uniphones for an individual speaker.

FIG. 6 illustrates the adaptive memory with the electronic templates utilized in this invention. The bipolar outputs from the feature shift register emitter followers 87 through 90, FIG. 5, are the inputs to the adaptive memory units 6 known as electronic templates 99, not all of which, for simplicity, are illustrated. Each input line from the feature shift register 4 is connected to all corresponding units in the twenty electronic templates 99 to provide a gate for adaption of the electronic templates and for subsequent comparison of input patterns with patterns stored in the templates.

Adapt switch 155 operates through consonant-vowel select switch 156 and one of the template selection switches 152 or 153 to set personalized uniphone patterns into the electronic templates. For example, uniphone C1 which may be the sound of "*f*" in "four" is entered by the operator after enunciating the word by pressing the adapt switch 155. This completes a circuit to template number one with the switches set as shown in FIG. 6. Individual clear unit 154 for template 1 is activated by the adapt pulse to momentarily remove maintaining voltage +12 from the storage units in template 1 only so that all previous data is cancelled before insertion of new data.

Figure 7:
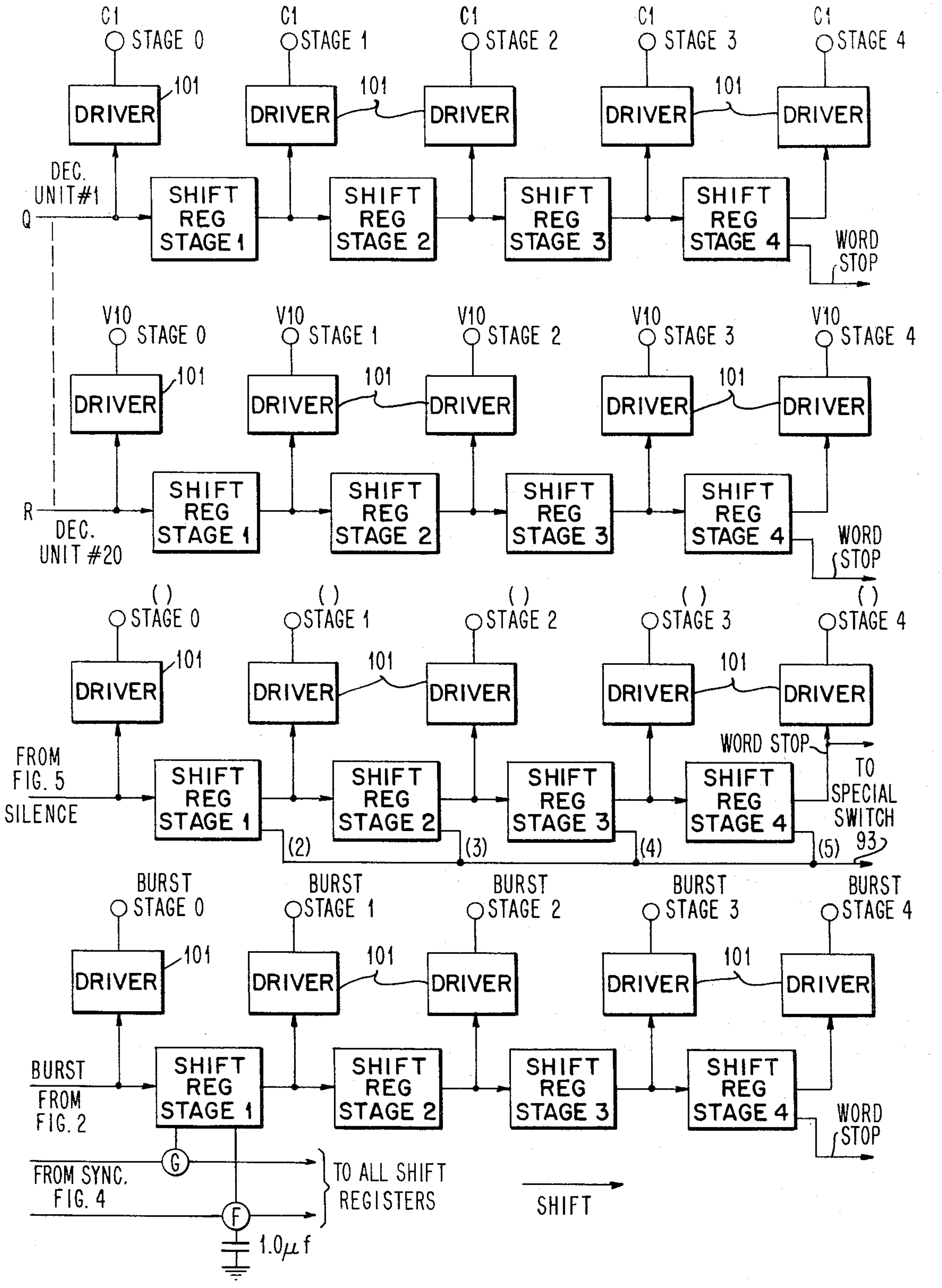
FIG. 7 illustrates a shift register used to hold the identified uniphones in word sequences for presentation to word detection devices.

For the first sound of a word, the special selection switch 93 will be set as shown in FIG. 5. The operation has been described previously. If another segment of the word is to be used, for example, the third sound of "three" to produce the EE vowel sound; the special selection switch 93 will be on position 3 which is connected to the inverse output of the second stage of the SILENCE shift register as shown in FIG. 7. Thus, the signal to Adapt Stop latch 95 is delayed until after the third feature sample is taken by clock 12. The desired pattern of 1's and 0's now appears in the feature shift register 4. In this example, the switch could have been set to position 4 or possibly 5, since the desired EE vowel sound may appear also in the 4th and 5th sample periods, depending on speaker enunciation. The best position of the switch to sample a given sound in a particular word may vary somewhat between operators. Usually, best results are obtained by using sample positions early in the word. When adapting for uniphone EE, the switch 156 would be transferred so that a connection exists between adapt switch 155, vowel side of switch 156, with select switch 153 set to position 1 on template 99 position 11. Thus, the code for EE would be stored in the template (number 11) controlling the decision unit 100 for V1 uniphone. Similarly, other consonant and vowel sounds would be selected from suitable words and stored in other sections of the adaptive electronic templates. The degree of match between two patterns is indicated by the voltage appearing on the summation lines $\Sigma 1$ through $\Sigma 20$ at the output of templates 99. These summation signals are the inputs to decision units 100, which are modified to allow three or four decision units to be on simultaneously if there are more than one or two equal degrees of match. Decision units 100 are simply threshold detectors with emitter degenerative resistors. This is an important feature of the uniphone adaptive memory since it allows "clustering." That is, a "kernel" may represent a group of uniphones and be stored in the templates. Then, the uniphone threshold is set to recognize all members of the cluster that are within a certain distance, usually one bit (hamming distance equal 1). An example of this type of adatation for the use of the foregoing terms is as follows:

Referring to FIG. 12, a chart showing twenty hypothetical uniphone coding arrangements is illustrated together with an illustrative list of thirteen common words broken into vowel, consonant, silence, and burst segments for analysis. An arbitrary list of ten consonant sounds and ten vowel sounds has been found adequate to describe a vocabulary of approximately 50 words. These 20 features or uniphones, are utilized together with the silence indication and the burst indication to provide this amount of recognition ability. If larger and more complicated catagories of sounds are to be recognized, the uniphone list can be expanded and the number of stages in uniphone shift register for storing identified uniphones can be expanded along with the number of electronic templates used to satisfy the expanded set of uniphone requirements. Of course, the uniphone to word conversion device 9 will also require augmentation if a larger library is to be recognized. In the charts for FIG. 12, it should be understood that the uniphone coding shown is arbitrary and would depend on the individual voice speaking in each case. In the leftmost columns of each half of the chart under the label "consonant" or "vowel" are listed 10 representative sounds. To the right of each vowel or consonant under the columns numbered 1 through 8, the existance of a 1 indicates that a specific feature from that segment of a frequency analyzer filter array has been actuated to a degree above the floating threshold and the absence of a 1 indicates that that feature has not been identified. The patterns of 1's and 0's for each vowel and consonant are known as uniphones which are identified for each particular speaker during a training period. These are the patterns that are stored in the adpative memory electronic templates 99 for comparison against incoming signals.

The following illustrates an example of the kernel and clustering concepts. An aribtrary vowel uniphone designated V1 might be encoded as 01100001 and represent, for example, the EE sound or the second sound which is produced when "eight" is pronounced or the third sound when the word "three" is pronounced. This coding represents a kernel for that particular uniphone V1. However, variations of V1 which are within hamming distance of 1 can also be recognized if the recognition threshold 148 on the decision units 100 is properly adjusted. Thus, variations of V1 which could be recognized as the same would be 01100011, 01110001, 00100001. For another vowel uniphone designated V2, which might be the AA sound, or the first sound when the word "eight" is pronounced, might be represented as 00100011 with variations 01100011, 00100001. From this it is clear that the first variation of V1 and the first variation of V2 are the same. When this uniphone code appears in this particular speaker's voice, both V1 and V2 will be indicated by the decision units. This allows for normal variation in sounds which occur in different words for any speaker's voice. Essentially a choice is given in that a certain sound in a word may be either V1 or V2. In this case, both may be stored in a word library, to be described later, so that either sound will be recognized as forming a part of a given word to be recognized. Si'ence, indicated as all 0's from the feature shift register, is within one bit distance from any single bit feature such as an arbitrary C1 consonant uniphone of 10000000 which might be the F sound of "four" (the first sound), etc. Similarly, the tenth consonant might be 00000001 which could be N for the first sound in "nine", or the fifth sound in "nine", or the fifth sound in "one", etc. The decision units 100 are interlocked by a constant current source 147 which is set to control the maximum number of outputs allowed, for example: four. This common interlock line also sets the voltage threshold for the decision units under control of the uniphone threshold adjustment 148. This is usually set for a hamming distance of "one" as has been described. In order to assure correct operation of the decision units, the threshold is removed when a decision is detected by means of current sensor 149. This threshold release operation is fully described in IBM Technical Disclosure Bulletin, Vol. 14, No. 2, July, 1971, pages 493,494. Releasing the threshold assures full outputs from all decision units that have reached the threshold. Inverter 150 clamps the common interlock line in response to pulses from clock 12. This cuts off all decision units and restores the threshold and prevents decisions under circumstances to be discussed later.

Direct outputs from decision units 100 are at the correct level and phase to be applied directly to the uniphone shift regisers 7.

Turning now to FIG. 7, uniphone shift registers 7 together with plugboard drivers for the uniphone to word conversion apparatus are illustrated. The uniphones identified in the adaptive memory electronic templates 99 along with silence and burst indications are shifted through a series of four shift register stages to store information for at least four uniphone patterns for any given word. The shift register stages are arbitrarily designated as stages 1 through 4 in the detection of a uniphone for a given word. Each decision unit 100 is connected to a four-stage row in shift register 7. All stages in shift register 7 are shifted once each time a uniphone is recognized. Stages in shift registers 7 arbitrarily assigned to the C1 uniphone (consonant number 1) appear at the top of FIG. 7. In association with each stage designated as 1 through 4, is a plugboard driver 101. There are five drivers 101 so that an indication stage $\phi$ in a row of register 7 can be indicated, this driver being identified as the C1-Stage 0 through V10-Stage 0 driver. In FIG. 7, only the rows in shift register 7 for consonant C1 through vowel V10, the silence indication, and the burst indication are shown for the sake of brevity.

Plugboard drivers 101 are connected to the inputs of the first stages in all shift register rows in shift register 7, and to the outputs of all of the stages in each row in shift register 7, so as to give outputs to the plugboard 9 which is the uniphone sequence to word conversion means for five possible phases or states of the four register stages in each row. By this means, 110 signal outputs are provided from 88 shift register stages or cells, numbered 1 through 4 in each row of shift register 7. The feature shift register 4 controls the timing of outputs from template units 99 and both feature shift register 4 and the uniphone shift register 7 are synchronized by the voice controlled clock 12 so that all phases of all shift registers are synchronized from a single source. Note, that the silence shift registers included in the uniphone shift register 7 have an inverse output connected to a special switch 93, one for each stage in shift register row assigned to the silence indication functions for use during training and adaptation which will be discussed later. The special switch 93 is utilized to select any of five sound samples from a given word. Note also, that the inverse output position on stage 4 of all of the uniphone register rows except for the silence and the direct output of the silence row are used for the word stop indication which will be described later with reference to the interlocks and controls 13.

Figure 8:
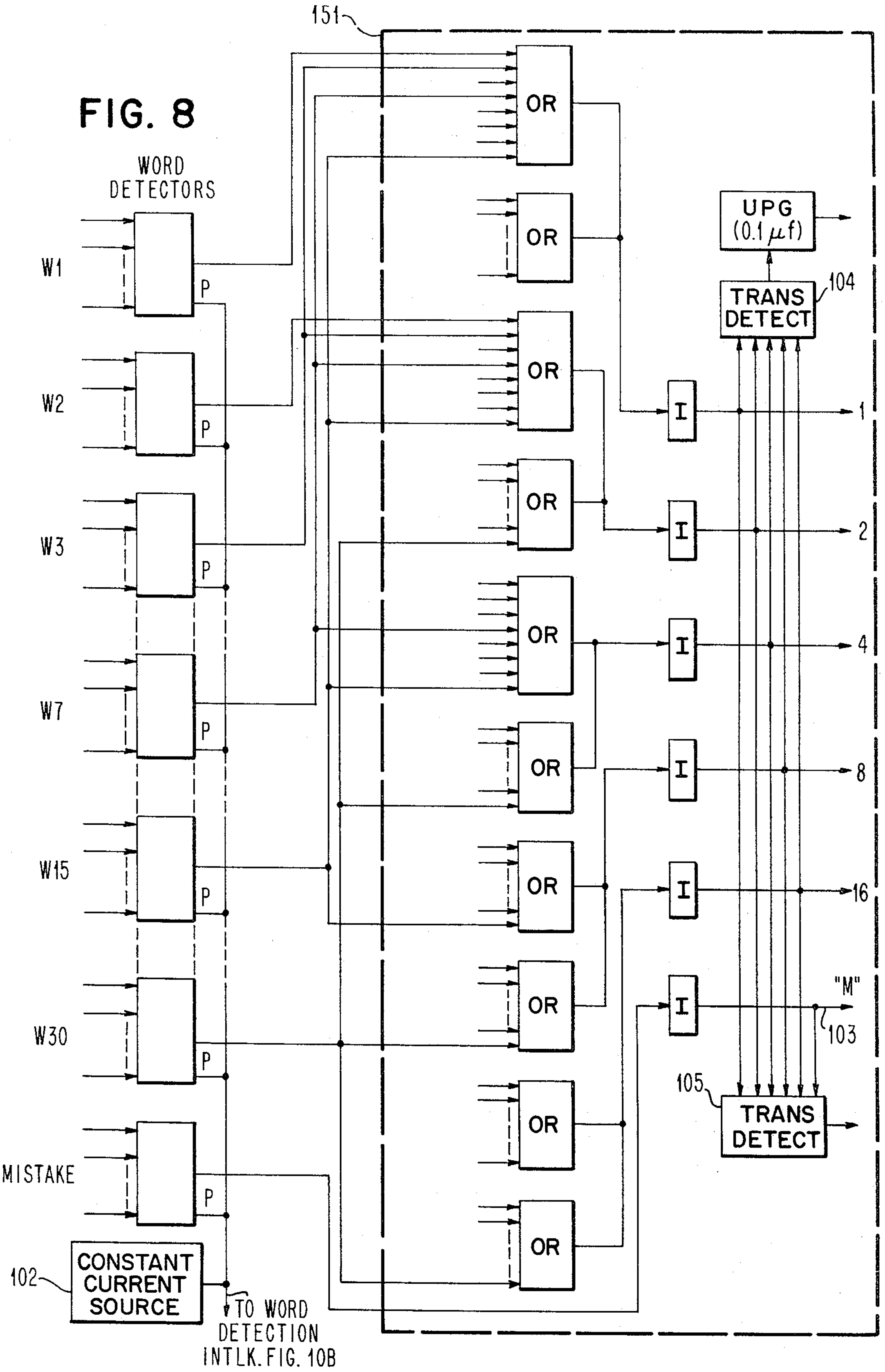
FIG. 8 illustrates in schematic form a word detection and binary encoding device utilized in the invention.

Referring to FIG. 8, the word detection and binary encoding means 10 is illustrated. In the present example, the specific uniphone sequence which describes a given word as enunciated by a given speaker is wired from the uniphone shift register 7 from the plugboard driver units 101 to word detection units in 10. For example: the word "one" may begin with uniphone C10 or V10, followed by uniphone V8, followed by uniphone V7, followed by uniphone C10 or V10, followed by the stop consonant silence or uniphone C10. When a word having five uniphones has entered, the first uniphone will have progressed to stage 4 in shift register 7, the second uniphone will be located in stage 3, the third in stage 2, and the fourth in stage 1, with the last uniphone being in stage 0. The eight possible inputs for word "one" would be wired to plug-board 9 as follows: Consonant 10 and vowel 10, either of which may be the first uniphone for word "one", are wired from stage 4 to the input of the detector for word "one". V8 is wired from stage 3 to the input of the detector for word "one"; V7 from stage 2, C10 and V10 from stage 1, and C10 and the stop silence from stage 0.

Any of the following versions of the word "one" will then have five inputs energized to the word detector for word one:

| Stage 4 | Stage 3 | Stage 2 | Stage 1 | Stage 0 |
|---|---|---|---|---|
| C10 | V8 | V7 | C10 | ( ) |
| V10 | V8 | V7 | C10 | ( ) |
| V10 | V8 | V7 | C10 | C10 |
| C10 | V8 | V7 | V10 | C10 |
| C10 | V8 | V7 | V10 | ( ) |
| C10 | V8 | V7 | V10 | ( ) |
| V10 | V8 | V7 | V10 | ( ) |

A deletion or substitution of any given uniphone will reduce the number of inputs to four. However, this will still be a reasonable number for recognition. As noted above, under the term "clustering," a variant of any of the above sounds that is in a cluster will give the correct output, possibly with another output. This will not affect the recognition of "one" but may bring another word closer.

The inputs of the word detector units produce a linear sum which is compared to a threshold voltage appearing at the terminal of W1 in FIG. 8 designated P. A constant current source 102 allows only one word indicator to be on at a given time. If there is a tie or a dead heat, both words detected are rejected. Rejection also occurs if all word sums are below the set threshold. The word "mistake" or "miss" is uttered by the speaker to correct a rejection or substitution. Words recognized in recognition units W1 through W30 are binary encoded by binary encoder 151 to the number of the word detector. Thus, any word may use any output code. (Except the functional words which must be wired to the fixed positions such as mistake, miss, reset, and enter data, which will be described in greater detail later.) The word "mistake" energizes the M line 103 to the output register 11. Words which are detected by detectors 1 through 30 energize both 104 and 105 transition detectors through their coded outputs while the M line 103 energizes only transition detector 105.

Figure 9:
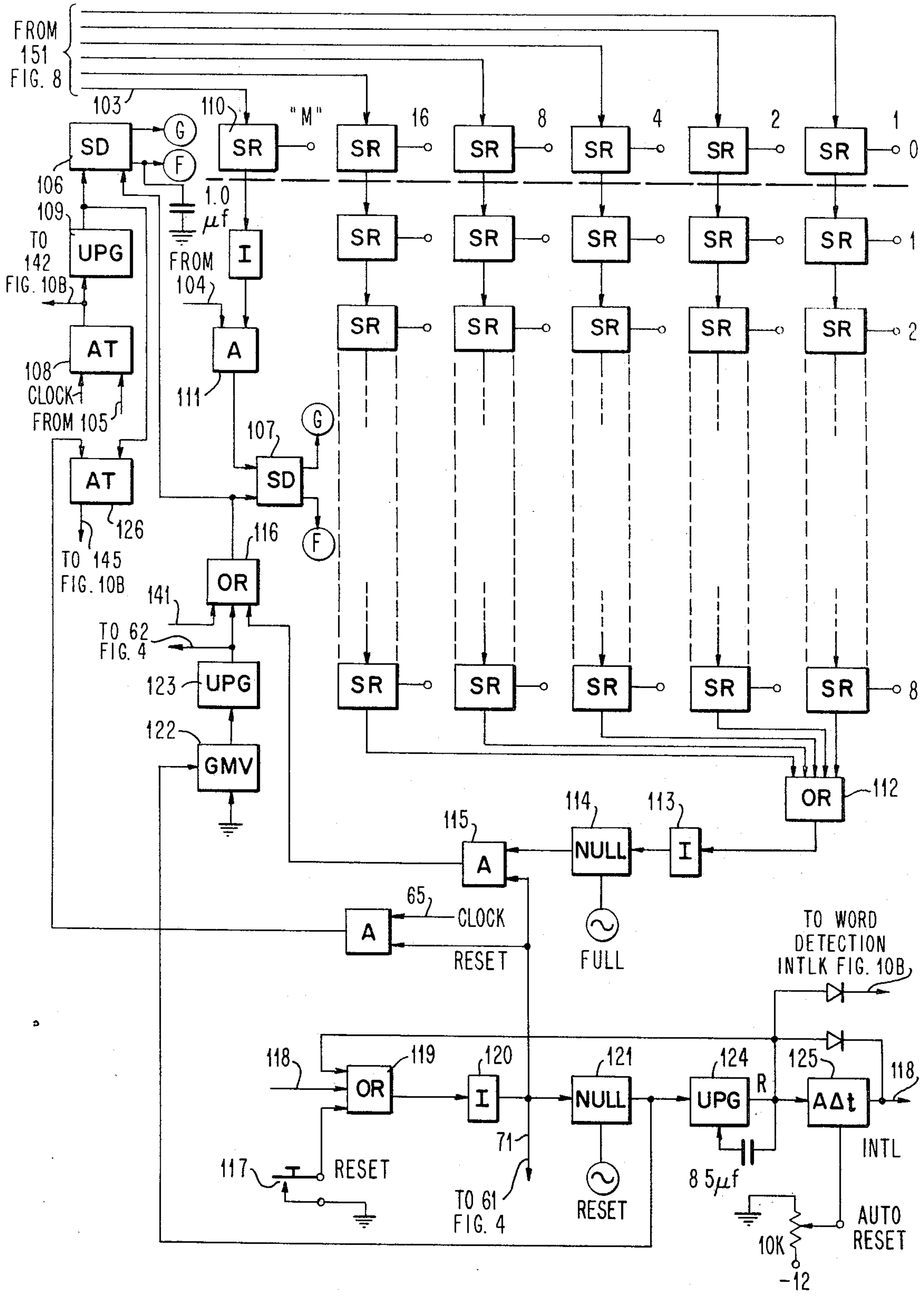
FIG. 9 illustrates the reset interlocks and output register utilized in the invention.

FIG. 9 illustrates the output register 11. Output register 11 is in two parts with separate sync drivers 106 and 107. The first segment, indicated by a 0 at the right hand side of the top row of register cells, is a temporary register for the five bit code which comes from binary encoded 10 just discussed. It also includes a register for M line 103. This segment of the register 11 holds the word code and displays it for the operator's inspection and validation. If the code is valid, i.e., if it is the proper code for the word, and the word has thus been properly recognized, the operator speaks the next word which enters into register 0 and the validated code moves to register stage 1. Any other code in higher shift registers also shift by one position. If a reject or error appears in register 0, the operator says "mistake." Now, 105 only operates 106 through the advance trigger 108 which operates the universal pulse generator 109 when it is turned off by the clock pulse following a turn-on from 105. Universal pulse generator 109 emits a pulse which operates 106 and sets the M register 110 on while it clears the code now stored in register 0. Since 104 will not operate, 107 has no input and output register 11 will not advance. Neither will register 11 advance when the correct data is read into register 0 because the M register 110 holds off AND gate 111. The new data word operates 105 and 106 to clear out the M register 110 and to set in the new code in register 0. The advance trigger 108 delays the operation of 106 so that M in register 110 is left on to block the operation of 104 to prevent shifting of the output register 11. FUrther validated codes may be entered and shifted as before until the output register 11 is full. A code entering register 8 operates through OR gate 112, inverter 113, null inverter 114, AND gate 115 and OR gate 116 to clamp both 106 and 107 and prevent any further data shifting.

Register 11 may be cleared at any time by reset key 117 or by saying "reset". Saying reset will be decoded to provide a signal on line 118 to OR gate 119 to provide coordinated reset signals. Either type of input raises OR gate 119 which provides a reset interlock 71 by the connection to clock 12 through inverter 120. A reset indication is provided by null inverter 121 which also turns on gated multivibrator 122. This provides a clock pulse through universal pulse generator 123 and also provides pulses through OR gate 116 to shift out the contents of register 11. The reset signal 71 prevents the "full" output from null inverter 114 from blocking shifting action by means of AND gate 115. A reset sustaining circuit operates through universal pulse generator 124 to OR gate 119. Time delay 125 may be set to repeat the reset operation in a cyclical manner for data gathering operations having fixed or prescribed cycle times. Unit 126 provides a pulse during the clock period following a decision to clamp the decision interlock and prevent rerecognition of the same word as will be further described under interlocks and controls.

Figure 10A:
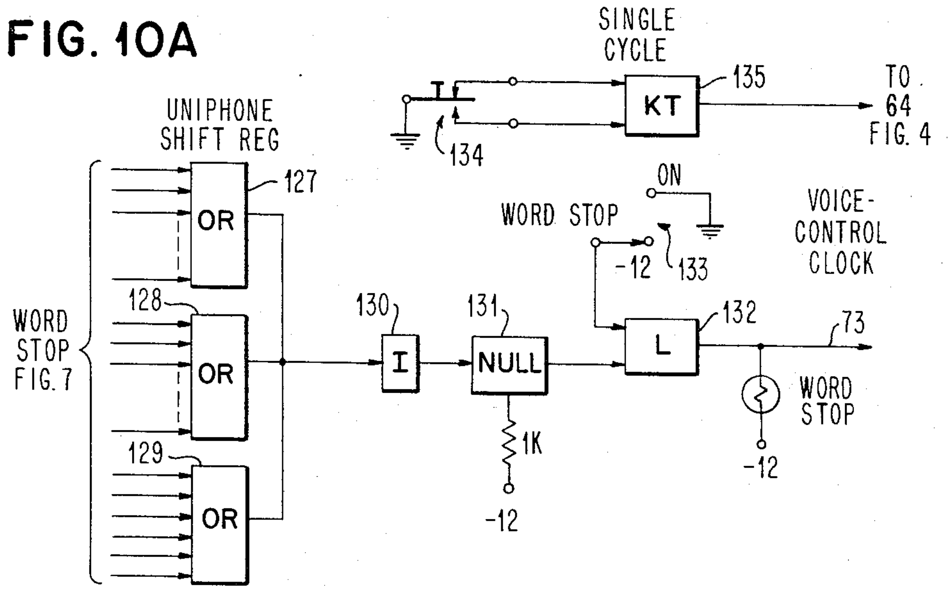
FIGS. 10A and 10B illustrate in greater detail additional interlocks and controls utilized in the invention.

Turning to FIGS. 10A and B, the interlocks and controls will be discussed. Word stop outputs from the inverse outputs on the shift registers 1 through 4 at each row of uniphone shift registers 7 are mixed in OR gates 127 through 129. Inverter 130 and null inverter 131 restore both signal level and signal phase to operate latch 132 which provides an output 73 to clock 12 and a visual indication. A word stop switch 133 prevents setting this latch when the switch 133 is off. A single cycle switch 134 operates a key trigger 135 which has an output connected to clock 12 through the universal pulse generator 64 as indicated in FIG. 4. This allows single cycling except when adapt clamp and word stop interlocks are effective, as will be discussed.

Command words "reset" and "enter data" are plugged from the suitable uniphone sequences for a given speaker to be recognized by the word detectors 136 and 137 respectively. When "reset" is recognized, the output from word recognition unit 136 rises and initiates a resetting operation in the output register 11, as has already been described. It also mixes in OR gate 142 with the signal output from advance trigger 108 as illustrated in FIG. 9 and the "E" (Enter Data) word detector output 137 to remove the word threshold voltage. The output from unit 108 in FIG. 9 is on for all data words and "mistake" since it is turned on by unit 105 in FIG. 8. Inverter output from inverter 138 lowers the sensitivity of the speech preamplifier 14 during reset operations. The recognition of "enter data" from word detector 137 sets latch 139 to indicate "E" on indicator 140 and to clamp the output register 11 through OR gate 116 as illustrated in FIG. 9, where it is connected via line 141. Latches 95, 132 and 139 are reset by the reset key 97 or by the decoding of the word "reset".

Figure 10B:
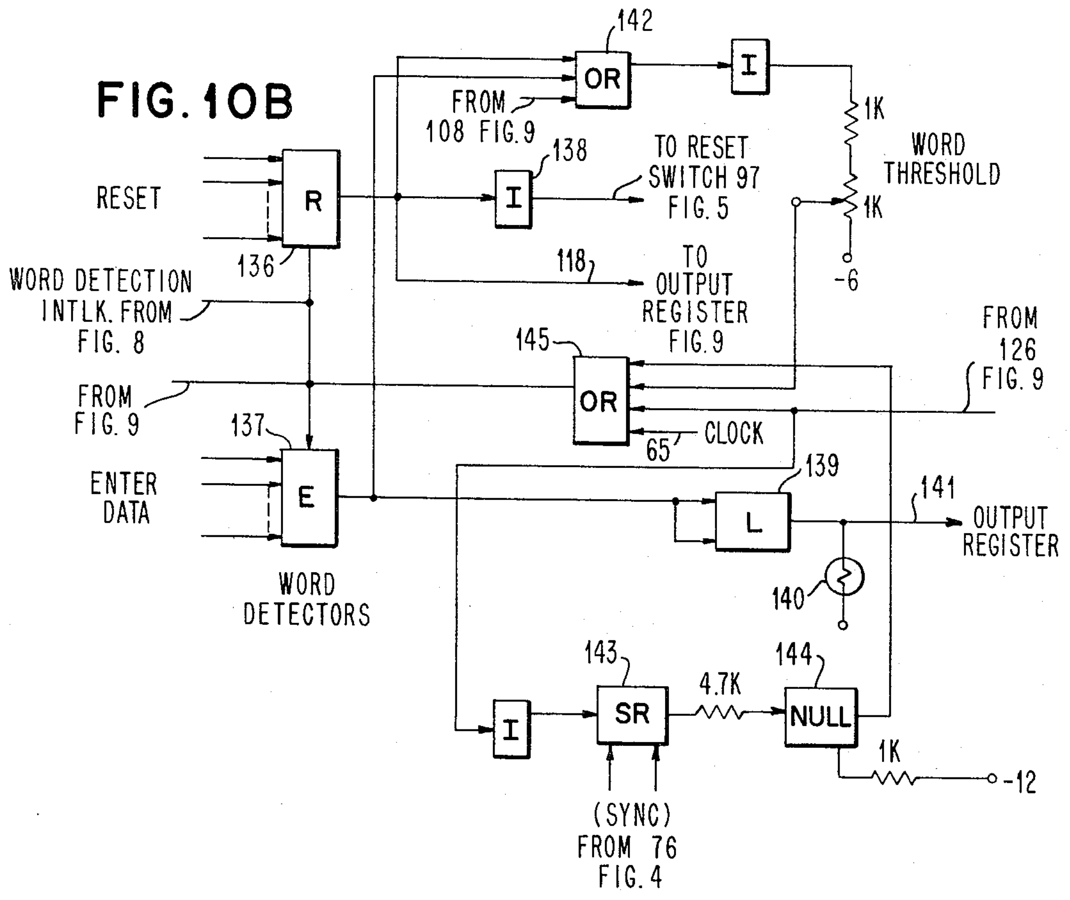

The second cycle clamp driven by the output from advance trigger 126 in FIG. 9 mixes in OR gate 145 of FIG. 10B to clamp the interlock line to the word detectors to prevent recognition following a decision at the inputs of the word detectors designated P in FIG. 8. Shift register 143 provides an additional cycle of delay which is shifted for signal level and inverted by null unit 144 and mixed with the signal from advance trigger 126 on FIG. 9 and the adjustable threshold voltage level in OR gate 145. The clock pulse on line 65 from universal pulse generator 64 in FIG. 4 also mixes in OR gate 145 so that the threshold is reset at every clock pulse. Also note, the diode connection of the reset pulse stretching unit universal pulse generator 124 on FIG. 9 in the output register.

The function of the above interlock is to make certain that a word decision can be made only when the system is not resetting, or between clock pulses, and is after at least two clock periods following a previous decision. A corollary to this consideration is that a word must be at least three clock periods long; an assumption which works well in practice.

Some words may be only one or two clock periods long unless the voice controlled clock previously described is used. This is one of the advantages of this system over constant clocking systems.

Figure 11:
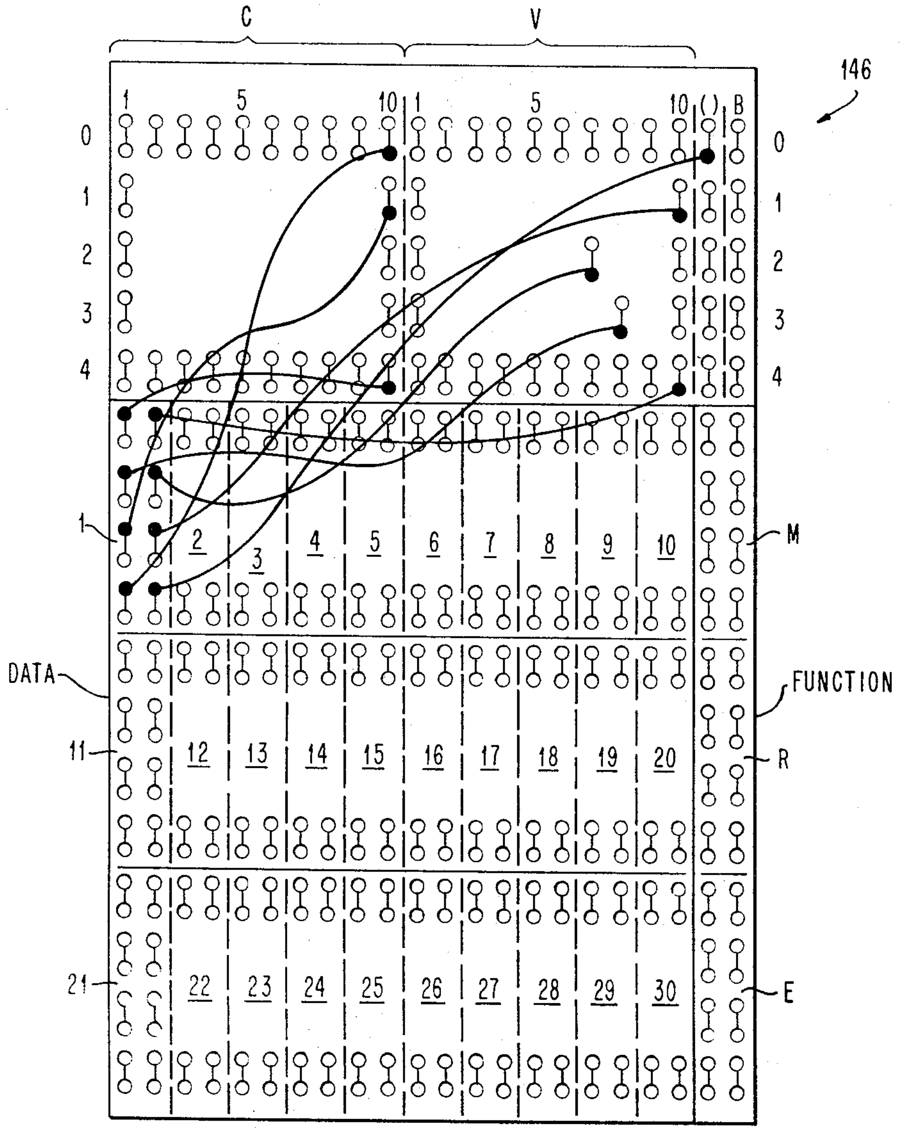
FIG. 11 illustrates a uniphone sequence word library plugboard device utilized in the invention.

Turning to FIG. 11, the uniphone sequence to word conversion device is illustrated as a panel plugboard 146. The space on the plugboard illustrated is limited to 33 eight input word detections, but a larger plugboard could be used if more words were required. An alternative to the plugboard would be to store uniphone sequences as data on a disc file or in core storage of a general purpose computer. The adaptive memory with electronic templates used for uniphone recognition could well be implemented in a functional content addressable memory. In fact, if the memory is made large enough and if it were available, it could be used for the entire word library as well.

An example is given for the uniphone shift register to word detector wiring for word "one" previously referred to. The upper terminals of the plugboards are the outputs of the uniphone shift register. All terminals are connected in pairs to allow branching. The stage designation from zero to four is shown at the right and left of each row of paired plug receptacles. Usually, only the lower receptacle of a pair will be used, leaving the upper free for testing. Desired outputs from the uniphone shift register plug receptacles are wired to any of the eight inputs to each word detector. These are numbered from one to 30 and the special detectors described previously are located at the right and labeled M for "mistake", R for "reset", and E for "enter data." The outputs for the M, R, and E word detectors have a fixed function as described above. The word detectors one to 30 result in binary coded outputs corresponding to the number designated.

While the invention has been explained and described with reference to a preferred embodiment thereof, numerous modifications thereof will be readily apparent to those skilled in the art without departing from the spirit and scope of the invention.

What is claimed is:

1. A method of automatically recognizing spoken words, comprising the steps of:

separating full bandwidth electronically manifested and amplified speech signals in an analyzer for passing individual sub-bandwidth components according to frequencies;

sensing continuously at a delayed time following a start signal the steady-state output condition signals from said analyzer sub-bands to determine which of said signals are above a continuously defined and varying voltage threshold;

storing in a temporary storage device at times determined by clocking signals generated by a clock whose clocking rate is dependent on the speakers's production of steady-state vocal sounds and on time delays built into said clock which are activated in response to said vocal sounds the patterns of information signals indicative of which of said sensed outputs are above said threshold and also indicative of which of said outputs are below said threshold;

comparing said temporarily stored signal patterns with other patterns of signals previously stored in a memory means and identifying the best individual match therebetween for each said temporarily stored pattern;

signalling the information results of said comparison step for each said temporarily stored signal pattern;

storing sequentially said information signals from said comparison step as uniphone codes for the steady-state speech signals sensed in said sensing step; and recognizing groups of said sequentially stored uniphone codes as words by means of a uniphone sequence-to-word conversion device library, thereby identifying said spoken words.

2. A method as described in claim 1, further including the step of:

encoding said recognized words from said converting step into coded form for transmission out of the system as recognized word codes.

3. A method as described in claim 1, wherein:

said separating, storing and comparing steps are coordinated and controlled by clocking signals generated by a clock at times derived in response to the integrated vocal production of speech signals by the speaker.

4. A method as defined in claim 3, further comprising a step of:

stopping said clock and said operations controlled thereby whenever an absence of signals is detected and by restarting said clock upon the resumption of input signals.

5. A method of claim 3, further comprising a step of:

changing said clocking signals to a slower rate whenever fricative sounds of a duration longer than 50 milliseconds are detected so as to reduce redundant samples of the same sound.

6. A word recognition system, comprising:

transducer means for electrically manifesting voice signals for recognition;

frequency analysis means connected to said transducer means for separating said voice signals into a plurality of frequency band components;

amplification means in association with said frequency analysis means for amplifying said frequency band components;

selection and signalling means connected to the output of said amplification means for selecting from among said amplified frequency band components those bands whose band electrical energy content exceeds a threshold level which varies for each frequency band in proportion to the amount of energy being passed in adjacent, sub-adjacent and any further removed adjacent frequency bands and for signalling which of said bands are so selected thus forming a band selection signal pattern;

synchronization and control means for coordinating the operations of the system by generating controlling clocking signals, said means being connected to said frequency analysis and selection means for the receipt of signals therefrom and responsive thereto for generating said clocking signals to control the operation of the following system elements, comprising;

first storage means connected to said selection means for temporarily storing said selection signal pattern outputs therefrom;

second storage means for storing a plurality of signal patterns expected from the output of said selection means;

comparison, decision and signalling means connected to said first and second storage means for comparing band selection signal patterns from said selection means with said patterns stored in said second storage means and for deciding which comparison results in the closest match and for signalling the identity of the pattern in said second storage means so chosen;

third storage means connected to the output of said comparison means for temporarily storing the identities of a plurality of said chosen patterns for input, under the control of said synchronization and control means, to the following elements;

conversion means connected to said third storage means for converting pluralities of pattern identities therefrom into word identities as recognized words upon the receipt of a clocking signal from said synchronization and control means.

7. A word recognition system as described in claim 6, further comprising:

word detection and encoding means connected to said conversion means for the receipt of word identities therefrom and for encoding the same; and a gated output storage means connected to said synchronization and control means and to said word detection and encoding means for the receipt of encoded words therefrom and for storing the same until said synchronization control means gates the output from said output storage means as an encoded recognized word.

8. A word recognition system as described in claim 7, wherein:

said frequency analysis means comprises a series of contiguous sub-bandpass filters whose combined bandpass encompasses the range of human voice signals;

said amplification means for amplifying said frequency band components comprises a logarithmic amplifier connected to the input of each said sub-bandpass filter and logarithmic amplifiers connected to the outputs of said filters whose sub-bandpass frequencies lie below 4K Hz; and said selection and signalling means comprises a voltage threshold comparator connected to the amplified output of each said sub-bandpass segment of said frequency analysis means, said comparator having a resistive network on its input to connect it with its adjacent, sub-adjacent and any further removed comparators and to proportionately raise the threshold voltage level for each said comparator so connected therewith.

9. A word recognition system as described in claim 8, wherein:

said comparison, decision and signalling means is an adaptive electronic memory comprising a plurality of electronic templates and associated decision circuits for signalling which of said templates contains the pattern having the best match.

10. A word recognition system as described in claim 9, wherein:

said conversion means is a plugboard to which pluralities of identified uniphone patterns are separately wired to form the words which are desired for outputs in response to spoken words.

* * * * *